US010850599B2

(12) United States Patent
Lian et al.

(10) Patent No.: US 10,850,599 B2
(45) Date of Patent: Dec. 1, 2020

(54) POWER-DRIVEN SYSTEM FOR VEHICLE AND VEHICLE (71) Applicant: BYD COMPANY LIMITED, Shenzhen (CN)

(72) Inventors: Yubo Lian, Shenzhen (CN); Heping Ling, Shenzhen (CN); Zhen Zhai, Shenzhen (CN); Fei Wu, Shenzhen (CN); Youbin Xu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 21 days.

(21) Appl. No.: 16/335,918

(22) PCT Filed: Aug. 4, 2017

(86) PCT No.: PCT/CN2017/096041
§ 371 (c)(1),
(2) Date: Mar. 22, 2019

(87) PCT Pub. No.: WO2018/059124
PCT Pub. Date: Apr. 5, 2018

(65) Prior Publication Data
US 2019/0308495 A1 Oct. 10, 2019

(30) Foreign Application Priority Data
Sep. 28, 2016 (CN) .......................... 2016 1 0857218

(51) Int. Cl.
*B60K 6/26* (2007.10)
*B60K 6/24* (2007.10)
(Continued)

(52) U.S. Cl.
CPC ................ *B60K 6/26* (2013.01); *B60K 6/24* (2013.01); *B60K 6/36* (2013.01); *B60K 6/42* (2013.01);
(Continued)

(58) Field of Classification Search
CPC ... B60K 6/20; B60K 6/22; B60K 6/26; B60K 6/36; B60K 6/42
See application file for complete search history.

(56) References Cited

U.S. PATENT DOCUMENTS 8,117,837 B1    2/2012  Karabetsos
10,166,973 B2 *  1/2019  Yang ...................... B60K 6/547
(Continued)

FOREIGN PATENT DOCUMENTS

CN    1854558 A    11/2006
CN    102308108 A   1/2012
(Continued)

OTHER PUBLICATIONS

The World Intellectual Property Organization (WIPO) International Search Report for PCT/CN2017/096041 dated Oct. 31, 2017 6 Pages.

*Primary Examiner* — Brian L Swenson
(74) *Attorney, Agent, or Firm* — Anova Law Group, PLLC (57) ABSTRACT

The present disclosure provides a power-drive system for a vehicle and a vehicle. The power-drive system comprises: an engine; a plurality of input shafts, the engine being configured to selectively engage with at least one of the plurality of input shafts; a plurality of output shafts; a first motor power shaft, a motor power shaft first gear being arranged on the first motor power shaft, the motor power shaft first gear and the plurality of output shafts linking with a differential of the vehicle respectively; a second motor power shaft, a motor power shaft second gear linking with one gear-position driven gear being arranged on the second motor power shaft; a transfer gear, configured to selectively engage with the motor power shaft first gear to link with the motor power shaft first gear, and selectively engage with the motor (Continued)

power shaft second gear to link with the motor power shaft second gear; and a first motor generator, configured to link with the transfer gear.

19 Claims, 4 Drawing Sheets

(51) Int. Cl.

| | | |
|---|---|---|
| *B60K 6/36* | (2007.10) | |
| *B60K 6/42* | (2007.10) | |
| *B60K 17/02* | (2006.01) | |
| *B60K 17/08* | (2006.01) | |
| *B60K 17/16* | (2006.01) | |
| *B60K 17/28* | (2006.01) | |
| *B60K 6/547* | (2007.10) | |
| *F16H 3/00* | (2006.01) | |
| *F16H 3/093* | (2006.01) | |
| *B60K 6/442* | (2007.10) | |
| *F16H 3/08* | (2006.01) | |

(52) U.S. Cl.
CPC .............. *B60K 6/442* (2013.01); *B60K 6/547* (2013.01); *B60K 17/02* (2013.01); *B60K 17/08* (2013.01); *B60K 17/16* (2013.01); *B60K 17/28* (2013.01); *F16H 3/006* (2013.01); *F16H 3/093* (2013.01); *F16H 2003/0822* (2013.01); *F16H 2003/0931* (2013.01); *F16H 2200/0052* (2013.01); *Y02T 10/62* (2013.01)

(56) References Cited

U.S. PATENT DOCUMENTS

| | | | |
|---|---|---|---|
| 10,274,050 B2* | 4/2019 | Lee | F16H 3/006 |
| 10,330,176 B2* | 6/2019 | Lee | F16H 3/093 |
| 2016/0069426 A1* | 3/2016 | Yang | F16H 3/006 |
| | | | 74/661 |
| 2016/0144702 A1 | 5/2016 | Byun | |
| 2016/0207392 A1 | 7/2016 | Zhang et al. | |

FOREIGN PATENT DOCUMENTS

| | | |
|---|---|---|
| CN | 104608612 A | 5/2015 |
| CN | 204323055 U | 5/2015 |
| CN | 204340646 U | 5/2015 |
| CN | 104773063 A | 7/2015 |
| CN | 104786816 A | 7/2015 |
| CN | 104842766 A | 8/2015 |
| DE | 102009059944 A1 | 7/2010 |
| EP | 2351661 A1 | 8/2011 |
| EP | 2955417 A1 | 12/2015 |
| EP | 3521083 A1 | 8/2019 |
| IT | 1347427 B | 9/2008 |

* cited by examiner

POWER-DRIVEN SYSTEM FOR VEHICLE AND VEHICLE

CROSS-REFERENCE TO RELATED APPLICATIONS

This application is a national phase entry under 35 U.S.C. § 371 of International Application No. PCT/CN2017/096041, filed on Aug. 4, 2017, which claims a priority to and benefits of Chinese Patent Application Serial No. 201610857218.8, filed with the State Intellectual Property Office of P. R. China on Sep. 28, 2016, the entire content of all of which is incorporated herein by reference.

FIELD

The present disclosure relates to the technical field of vehicles and, in particular, to a power-drive system for a vehicle and a vehicle having the power-drive system.

BACKGROUND

With constant consumption of energy, the development and utilization of new-energy vehicles have gradually become a trend. As one of the new-energy vehicles, hybrid vehicles driven by engines and/or motors have multiple modes and can improve the drive efficiency and the fuel economy.

However, in related technologies, the hybrid vehicles have a few drive modes, low drive efficiency, and low power generation efficiency under the stationary power generation condition.

SUMMARY

The present disclosure aims at resolving one of technical problems in related technologies at least to some extent. Accordingly, the embodiments of the present disclosure propose a power-drive system with rich drive modes and high drive efficiency for a vehicle.

The embodiments of the present disclosure further provide a vehicle.

A power-drive system for a vehicle according to an embodiment of the present disclosure, comprising: an engine; a plurality of input shafts, the engine being configured to selectively engage with at least one of the plurality of input shafts, a gear-position driving gear being arranged on each input shaft; a plurality of output shafts, a gear-position driven gear being arranged on each output shaft, the gear-position driven gears correspondingly meshing with the gear-position driving gears; a first motor power shaft, a motor power shaft first gear being arranged on the first motor power shaft, the motor power shaft first gear and the plurality of output shafts linking with a differential of the vehicle respectively; a second motor power shaft, a motor power shaft second gear being arranged on the second motor power shaft, the motor power shaft second gear linking with one gear-position driven gear; a transfer gear, configured to selectively engage with the motor power shaft first gear to link with the motor power shaft first gear, and selectively engage with the motor power shaft second gear to link with the motor power shaft second gear; and a first motor generator, configured to link with the transfer gear.

The power-drive system for a vehicle according to an embodiment of the present disclosure is rich in drive modes and high in drive efficiency in a pure electric mode and a hybrid mode, thereby improving the dynamic property and economic efficiency of the vehicle.

In some examples of the present disclosure, the power-drive system further comprises: a first clutch device, arranged between the engine and the plurality of input shafts; and a second motor generator, wherein the second motor generator and the engine are located on an input side of the first clutch device, the plurality of input shafts is located on an output side of the first clutch device, and the second motor generator is configured to carry out stationary power generation using at least part of power of the engine when the vehicle is parked.

In some examples of the present disclosure, the first clutch device is a double-clutch device and has an input end, a first output end and a second output end, the input end selectively engaging with at least one of the first output end and the second output end.

In some examples of the present disclosure, the input end is provided with input end outer teeth, and the second motor generator links with the input end outer teeth.

In some examples of the present disclosure, the second motor generator is coaxially connected with the input end.

In some examples of the present disclosure, a second clutch device is arranged between the second motor generator and the engine.

In some examples of the present disclosure, the second clutch device is arranged inside a rotor of the second motor generator.

In some examples of the present disclosure, the engine, the second clutch device and the input end of the first clutch device are arranged coaxially.

In some examples of the present disclosure, the rated power of the first motor generator is greater than that of the second motor generator.

In some examples of the present disclosure, the rated power of the first motor generator is two or more times that of the second motor generator.

In some examples of the present disclosure, the second motor generator is located between the first clutch device and the engine.

In some examples of the present disclosure, a motor power shaft third gear is further freely sleeved on the first motor power shaft, the motor power shaft third gear meshes with the transfer gear, and a first motor power shaft synchronizer for engaging the motor power shaft third gear with the first motor power shaft is further arranged on the first motor power shaft.

In some examples of the present disclosure, the motor power shaft first gear is fixedly arranged on the first motor power shaft.

In some examples of the present disclosure, the motor power shaft second gear is idly sleeved on the second motor power shaft, and a second motor power shaft synchronizer for engaging the motor power shaft second gear with the second motor power shaft is further arranged on the second motor power shaft.

In some examples of the present disclosure, the first motor power shaft synchronizer and the second motor power shaft synchronizer share a first shift mechanism, and the engagement and disengagement states of the motor power shaft first gear and the first motor power shaft are opposite to those of the motor power shaft second gear and the second motor power shaft.

In some examples of the present disclosure, the power-drive system further comprises: an intermediate idle gear, which is idly sleeved on the first motor power shaft and meshes with one gear-position driven gear and the motor power shaft second gear respectively.

In some examples of the present disclosure, a motor power shaft fourth gear is further fixedly arranged on the second motor power shaft, and the motor power shaft fourth gear meshes with the transfer gear.

In some examples of the present disclosure, a reversing output gear is freely sleeved on one of the plurality of output shafts, and a reversing synchronizer for engaging the reversing output gear with the one of the plurality of output shafts is further arranged on the output shaft; and the power-drive system further comprises: a reversing shaft, a first reversing shaft gear and a second reversing shaft gear are fixedly arranged on the reversing shaft, the first reversing shaft gear meshes with one gear-position driving gear, and the second reversing shaft gear meshes with the reversing output gear.

In some examples of the present disclosure, the reversing output gear and the other adjacent gear-position driven gear share the reversing synchronizer.

In some examples of the present disclosure, the plurality of input shafts comprises: a first input shaft and a second input shaft, the second input shaft is sleeved on the first input shaft, a first-gear driving gear, a third-gear driving gear and a fifth-gear driving gear are arranged on the first input shaft, and a second-gear driving gear and a fourth-sixth-gear driving gear are arranged on the second input shaft; the plurality of output shafts comprises: a first output shaft and a second output shaft, a first-gear driven gear, a second-gear driven gear, a third-gear driven gear and a fourth-gear driven gear are freely sleeved on the first output shaft, and a fifth-gear driven gear and a sixth-gear driven gear are freely sleeved on the second output shaft; a first-third-gear synchronizer is arranged between the first-gear driven gear and the third-gear driven gear, a second-fourth-gear synchronizer is arranged between the second-gear driven gear and the fourth-gear driven gear, a fifth-gear synchronizer is arranged on one side of the fifth-gear driven gear, and a sixth-gear synchronizer is arranged on one side of the sixth-gear driven gear.

In some examples of the present disclosure, the reversing synchronizer is configured as the sixth-gear synchronizer.

In some examples of the present disclosure, a first output shaft output gear is fixedly arranged on the first output shaft, a second output shaft output gear is fixedly arranged on the second output shaft, and the first output shaft output gear, the second output shaft output gear and the motor power shaft first gear mesh with a main reducer driven gear of the vehicle respectively.

A vehicle according to an embodiment of the present disclosure comprises the power-drive system according to the above embodiments of the present disclosure.

The vehicle according to the embodiment of the present disclosure has the same advantages as the power-drive system according to the above embodiments of the present disclosure, and details are omitted herein.

DETAILED DESCRIPTION

The embodiments of the present disclosure are described in detail below. Examples of the embodiments are illustrated in the accompanying drawings. The embodiments described below with reference to the accompanying drawings are exemplary, and are used for explaining rather than limiting the present disclosure.

The following describes a power-drive system 100 according to an embodiment of the present disclosure in detail below with reference to the accompanying drawings. The power-drive system 100 can be applied to a vehicle 1000, e.g., a hybrid vehicle 1000.

The power-drive system 100 according to an embodiment of the present disclosure may include: an engine 1, a plurality of input shafts, a plurality of output shafts, a first motor generator 4, a transfer gear 43, a first motor power shaft 41, and a second motor power shaft 42. Of course, the power-drive system 100 may also include other mechanical components, e.g., a second motor generator 6, a first clutch device 5d, a second clutch device 7, a reversing shaft 8, a reversing output gear 83, and the like.

The engine 1 is configured to selectively engage with at least one of the plurality of input shafts. That is to say, when the engine 1 outputs power, the engine 1 can engage with the one of the plurality of input shafts to transmit power. Of course, the engine 1 can also simultaneously engage with several of the plurality of input shafts to transmit power. A gear-position driving gear is arranged on each input shaft, a gear-position driven gear is arranged on each output shaft, and the gear-position driven gears correspondingly mesh with the gear-position driving gears. Power transmission between the input shafts and the output shafts can be realized by the engagement between the gear-position driving gears and the gear-position driven gears. The output speeds of the output shafts can be changed by selecting the gear-position driving gears and the gear-position driven gears with different drive ratios.

Figure 1:
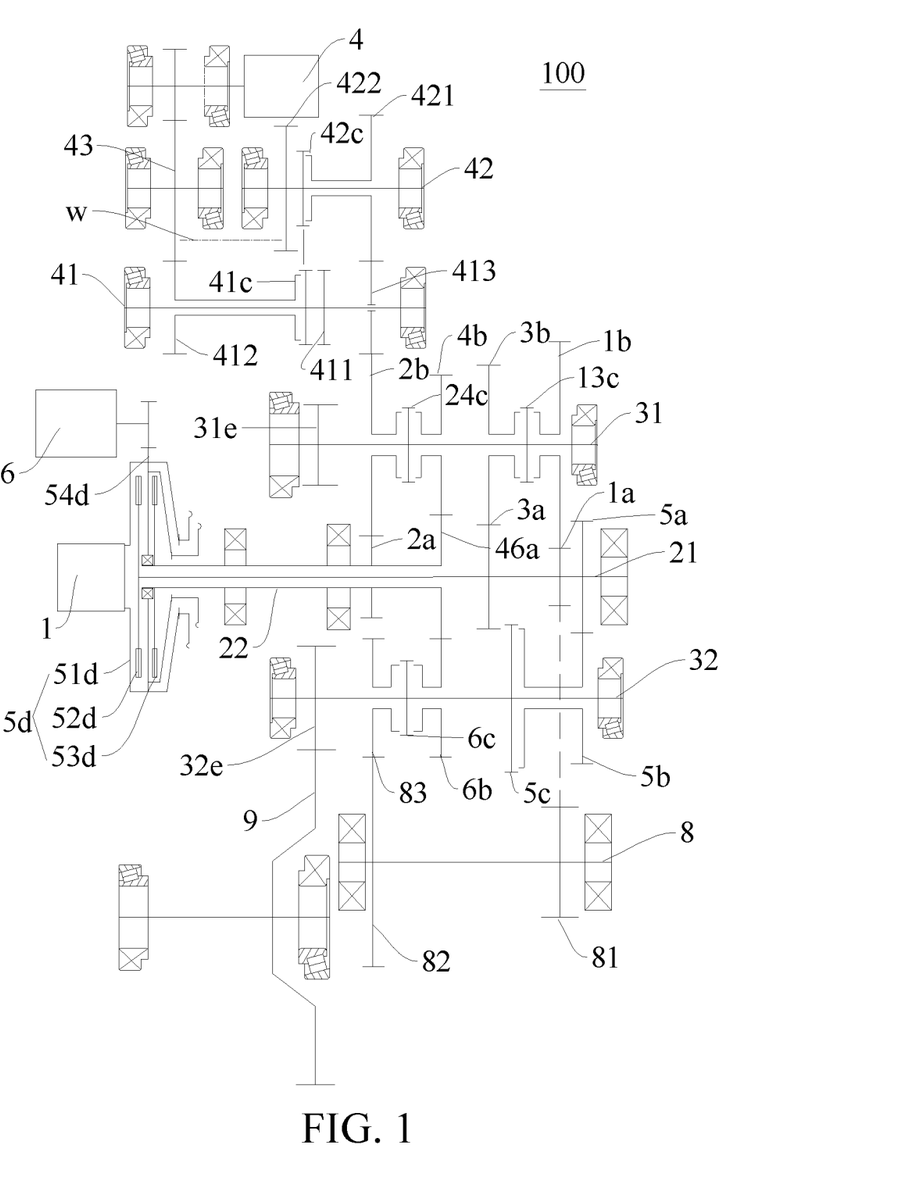
FIG. 1 is a schematic diagram of a power-drive system according to a first embodiment of the present disclosure.
Figure 2:
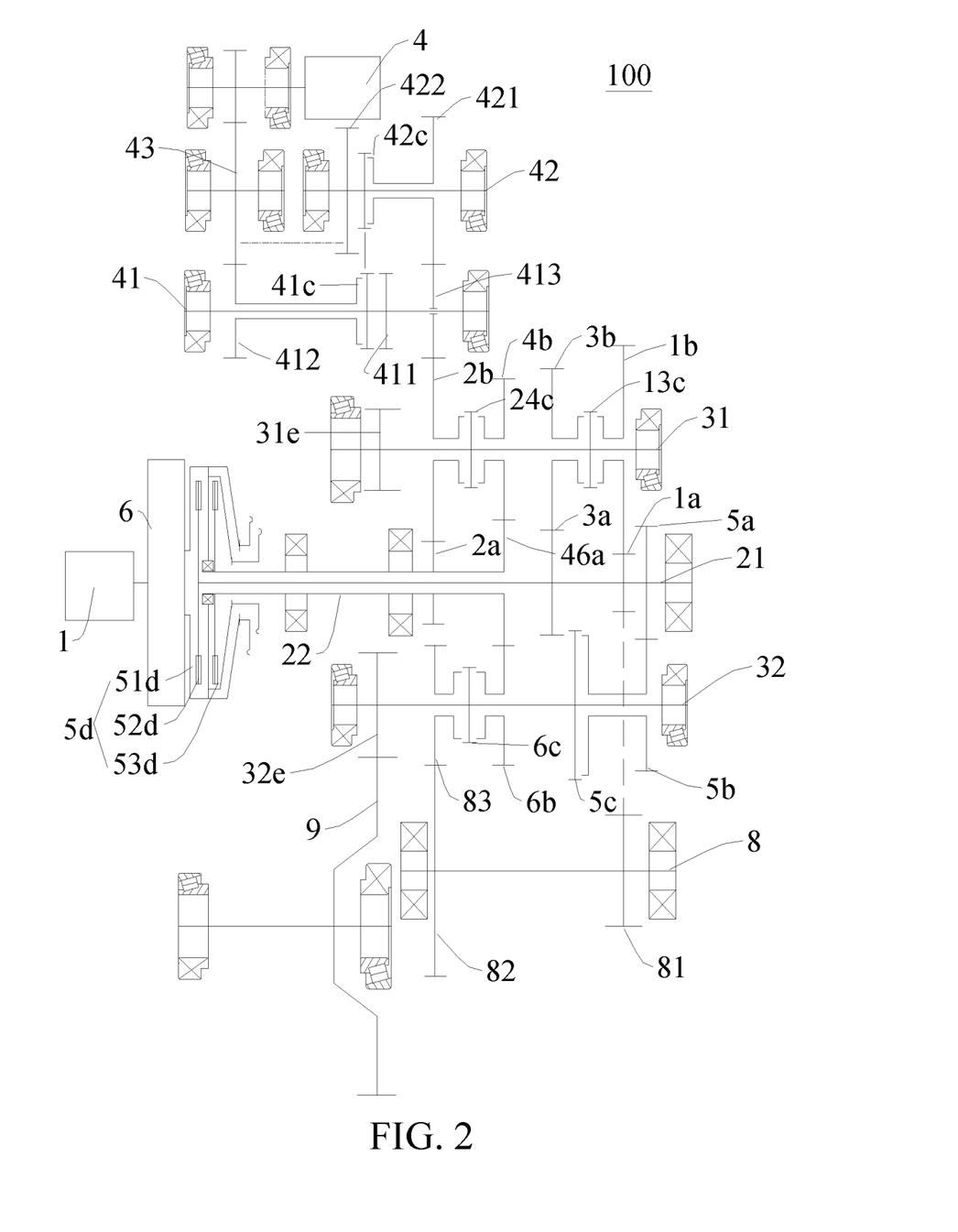
FIG. 2 is a schematic diagram of a power-drive system according to a second embodiment of the present disclosure.
Figure 3:
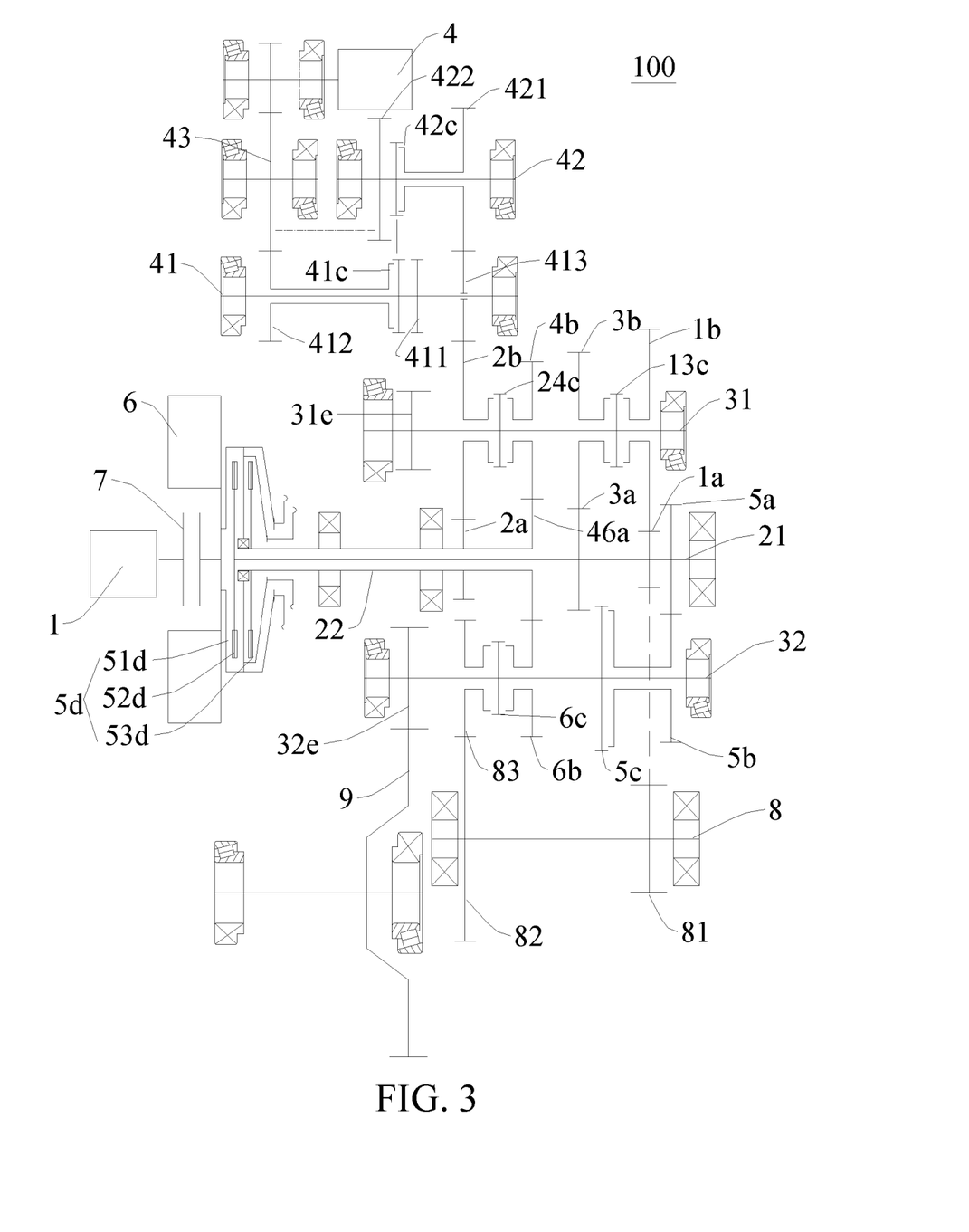
FIG. 3 is a schematic diagram of a power-drive system according to a third embodiment of the present disclosure.

The first clutch device 5d is arranged between the engine 1 and the plurality of input shafts, and the first clutch device 5d can allow the engine 1 to selectively engage with at least one of the plurality of input shafts. As shown in FIG. 1 to FIG. 3, the first clutch device 5d may be a double-clutch device, and has an input end 51d, a first output end 52d and a second output end 53d. The input end 51d can selectively engage with at least one of the first output end 52d and the second output end 53d. That is, the input end 51d may engage with the first output end 52d, or engage with the second output end 53d, or simultaneously engage with the first output end 52d and the second output end 53d.

For example, as shown in FIG. 1 to FIG. 3, the plurality of input shafts includes: a first input shaft 21 and a second input shaft 22, the first output end 52d is connected with the first input shaft 21, and the second output end 53d is connected with the second input shaft 22.

A first-gear driving gear 1a, a third-gear driving gear 3a and a fifth-gear driving gear 5a are arranged on the first input shaft 21. A second-gear driving gear 2a and a fourth-sixth-gear driving gear 46a are arranged on the second input shaft 22. The second input shaft 22 is sleeved on the first input shaft 21, thereby effectively shortening the axial length of the power-drive system 100, and reducing the space of the vehicle 1000 occupied by the power-drive system 100. The fourth-sixth-gear driving gear 46a means that the gear can be used as a fourth-gear driving gear or a sixth-gear driving gear, thereby shortening the axial length of the second input shaft 22, and better reducing the size of the power-drive system 100.

In the direction gradually away from the engine 1, the second-gear driving gear 2a, the fourth-sixth-gear driving gear 46a, the third-gear driving gear 3a, the first-gear driving gear 1a, and the fifth-gear driving gear 5a are arranged in sequence. By properly arranging the plurality of gear-position driving gears, the plurality of gear-position driven gears and the plurality of output shafts can be arranged reasonably, so that the power-drive system 100 is simple in structure and small in size.

The plurality of output shafts includes: a first output shaft 31 and a second output shaft 32. A first-gear driven gear 1b, a second-gear driven gear 2b, a third-gear driven gear 3b and a fourth-gear driven gear 4b are freely sleeved on the first output shaft 31. A fifth-gear driven gear 5b and a sixth-gear driven gear 6b are freely sleeved on the second output shaft 32. The first-gear driving gear 1a meshes with the first-gear driven gear 1b, the second-gear driving gear 2a meshes with the second-gear driven gear 2b, the third-gear driving gear 3a meshes with the third-gear driven gear 3b, the fourth-sixth-gear driving gear 46a meshes with the fourth-gear driven gear 4b, the fifth-gear driving gear 5a meshes with the fifth-gear driven gear 5b, and the fourth-sixth-gear driving gear 46a meshes with the sixth-gear driven gear 6b.

A first-third-gear synchronizer 13c is arranged between the first-gear driven gear 1b and the third-gear driven gear 3b, and the first-third-gear synchronizer 13c can be used for synchronizing the first-gear driven gear 1b with the first output shaft 31, and synchronizing the third-gear driven gear 3b with the first output shaft 31.

A second-fourth-gear synchronizer 24c is arranged between the second-gear driven gear 2b and the fourth-gear driven gear 4b, and the second-fourth-gear synchronizer 24c can be used for synchronizing the second-gear driven gear 2b with the first output shaft 31, and synchronizing the fourth-gear driven gear 4b with the first output shaft 31.

A fifth-gear synchronizer 5c is arranged on one side of the fifth-gear driven gear 5b, and the fifth-gear synchronizer 5c can be used for synchronizing the fifth-gear driven gear 5b with the second output shaft 32. A sixth-gear synchronizer 6c is arranged on one side of the sixth-gear driven gear 6b, and the sixth-gear synchronizer 6c can be used for synchronizing the sixth-gear driven gear 6b with the second output shaft 32.

As shown in FIG. 1 to FIG. 3, a first output shaft output gear 31e is fixedly arranged on the first output shaft 31, a second output shaft output gear 32e is fixedly arranged on the second output shaft 32, and the first output shaft output gear 31e and the second output shaft output gear 32e mesh with a main reducer driven gear 9 of the vehicle 1000 respectively. It can be understood that the power transmitted to the first output shaft 31 and the second output shaft 32 can be transmitted to the main reducer driven gear 9 through the first output shaft output gear 31e and the second output shaft output gear 32e respectively, thereby driving corresponding wheels to rotate. Power transmission exists between the main reducer driven gear 9 and a differential. Specifically, the main reducer driven gear 9 transmits power to the differential to drive the wheels to rotate.

A reversing output gear 83 is freely sleeved on one of the plurality of output shafts, and a reversing synchronizer for engaging the reversing output gear 83 is further arranged on the output shaft. As shown in FIG. 1 to FIG. 3, the reversing output gear 83 is arranged on the second output shaft 32, and the reversing synchronizer on the second output shaft 32 can be used for synchronizing the reversing output gear 83 with the second output shaft 32.

Further, a first reversing shaft gear 81 and a second reversing shaft gear 82 are fixedly arranged on the reversing shaft 8, the first reversing shaft gear 81 meshes with one gear-position driving gear, and the second reversing shaft gear 82 meshes with the reversing output gear 83. Specifically, the gear-position driving gear may be the first-gear driving gear 1a. The power transmitted to the first-gear driving gear 1a can be transmitted to the reversing shaft 8 through the first reversing shaft gear 81, the reversing shaft 8 can transmit the power to the reversing output gear 83 through the second reversing shaft gear 82, the reversing output gear 83 can transmit the power to the second output shaft 32 through the reversing synchronizer, the second output shaft 32 can transmit the power to the main reducer driven gear 9 through the second output shaft output gear 32e, and the main reducer driven gear 9 can transmit the power to the wheels on two sides through the differential to drive the vehicle 1000 to move.

Since the reversing output gear 83 is sleeved on the second output shaft 32, the reversing output gear 83 can share the reversing synchronizer with the other adjacent gear-position driven gear. In this way, the number of synchronizers arranged on the second output shaft 32 can be reduced, so that the axial length of the second output shaft 32 can be shortened, and the cost of the power-drive system 100 can be reduced. For example, the other gear-position driven gear may be the sixth-gear driven gear 6b. In other words, the reversing synchronizer may be configured as the sixth-gear synchronizer 6c. The reversing synchronizer (i.e., the sixth-gear synchronizer 6c) may be arranged between the sixth-gear driven gear 6b and the reversing output gear 83.

The second motor generator 6 and the engine 1 are located on an input side of the first clutch device 5d, and the second motor generator 6 may be located between the first clutch device 5d and the engine 1. The second motor generator 6 is arranged between the first clutch device 5d and the engine 1, so that the axial length of the power-drive system 100 can be effectively shortened, and the second motor generator 6 can be arranged rationally to improve the structural compactness of the power-drive system 100.

The second motor generator 6 can be a motor generator having small capacity and small size, thereby meeting the miniaturization requirement of a transmission. The internal structure of the transmission has strict requirements on the space, and the second motor generator 6 having small size occupies a small space of the transmission, so that the second motor generator 6 is prevented from interfering with other components (e.g., the first clutch device 5d), and the transmission is reasonable and compact in structure.

The plurality of input shafts is located on the output side of the first clutch device 5d. The second motor generator 6 is configured to carry out stationary power generation using at least part of the power of the engine 1 when the vehicle 1000 is parked. When the vehicle 1000 is parked, at least part of the power of the engine 1 can be directly transferred to the second motor generator 6 for power generation, or at least part of the power of the engine 1 can be indirectly transmitted to the second motor generator 6 for power generation through the input end 51d.

The following describes the connection and arrangement relationship between the engine 1 and the second motor generator 6 with reference to the accompanying drawings.

As shown in FIG. 1, input end outer teeth 54d may be arranged on the input end 51d, and the second motor generator 6 links with the input end outer teeth 54d. Thus, the power of the engine 1 can be transmitted to the second motor generator 6 through the input end 51d and the input end outer teeth 54d, and the second motor generator 6 can be used as a generator for stationary power generation.

As shown in FIG. 2, the second motor generator 6 and the input end 51d can be coaxially connected. The second motor generator 6 may be arranged between the input end 51d and the engine 1, such that the power of the engine 1 necessarily passes through the second motor generator 6 when being transmitted to the input end 51d, whereby the second motor generator 6 can be used as a generator for stationary power generation.

As shown in FIG. 3, a second clutch device 7 is arranged between the second motor generator 6 and the engine 1. The second clutch device 7 is a single clutch, and the second clutch device 7 can control the engagement and disengagement between the engine 1 and the second motor generator 6, and control the engagement and disengagement between the engine 1 and the input end 51d. By providing the second clutch device 7, the stationary power generation state of the second motor generator 6 can be reasonably controlled, so that the power-drive system 100 is simple in structure and reliable in drive mode conversion. In some embodiments of the present disclosure, the second clutch device 7 is arranged inside a rotor of the second motor generator 6. In this way, the axial length of the power-drive system 100 can be better shortened, so that the size of the power-drive system 100 can be reduced, and the arrangement flexibility of the power-drive system 100 on the vehicle 1000 can be improved. In addition, the second motor generator 6 can also be used as a starter.

In some embodiments of the present disclosure, the engine 1, the second clutch device 7, and the input end 51d of the first clutch device 5d are coaxially arranged. Thus, the power-drive system 100 is compact in structure and small in size.

It should be noted that, for the power-drive system 100 according to the above three embodiments, the second motor generator 6 is located between the engine 1 and the first clutch device 5d in the axial direction, so that the axial length of the power-drive system 100 can be effectively shortened, the second motor generator 6 can be reasonably arranged, and the structural compactness of the power-drive system 100 can be improved.

The first motor generator 4 is configured to link with the transfer gear 43. Specifically, a first motor gear may be arranged on a motor shaft of the first motor generator 4, and the first motor gear meshes with the transfer gear 43. Thus, when the first motor generator 4 is in operation, power transmission can be realized between the first motor gear and the transfer gear 43.

A motor power shaft first gear 411 is arranged on the first motor power shaft 41, the transfer gear 43 is configured to selectively engage with the motor power shaft first gear 411 to link with the motor power shaft first gear 411, and the motor power shaft first gear 411 links with the differential of the vehicle 1000. Thus, when the first motor generator 4 is used as a motor, the power of the first motor generator 4 can be transmitted to the differential through the first motor gear, the transfer gear 43, the first motor power shaft 41 and the motor power shaft first gear 411 in sequence to drive the vehicle 1000 to move. The power transmission path of the first motor generator 4 is short, and the waste of power in the transmission process can be reduced, so that the energy utilization of the first motor generator 4 can be improved.

The transfer gear 43 directly engages with the motor power shaft first gear 411. Alternatively, the transfer gear 43 indirectly engages with the motor power shaft first gear 411. For example, as shown in FIG. 1 to FIG. 3, the motor power shaft first gear 411 can be fixedly arranged on the first motor power shaft 41, a motor power shaft third gear 412 can be freely sleeved on the first motor power shaft 41, the motor power shaft third gear 412 meshes with the transfer gear 43, and a first motor power shaft synchronizer 41c for engaging the motor power shaft third gear 412 with the first motor power shaft 41 is further arranged on the first motor power shaft 41. That is, when the first motor power shaft synchronizer 41c synchronizes the motor power shaft third gear 412 with the first motor power shaft 41, the power at the transfer gear 43 can be transmitted to the first motor power shaft 41 through the motor power shaft third gear 412, and the first motor power shaft 41 can transmit the power to the differential through the motor power shaft first gear 411.

A motor power shaft second gear 421 is arranged on the second motor power shaft 42, and the transfer gear 43 is further configured to selectively engage with the motor power shaft second gear 421 to link with the motor power shaft second gear 421. As shown in FIG. 1 to FIG. 3, the broken line W indicates a spatial meshing relationship between the transfer gear 43 and the motor power shaft second gear 421, whereby the transfer gear 43 simultaneously meshes with the motor power shaft second gear 421 and the motor power shaft third gear 412.

The motor power shaft second gear 421 links with one gear-position driven gear. For example, the gear-position driven gear may be the second-gear driven gear 2b. An intermediate idle gear 413 is arranged between the second-gear driven gear 2b and the motor power shaft second gear 421, and the intermediate idle gear 413 is idly sleeved on the first motor power shaft 41. The arrangement of the intermediate idle gear 413 can ensure that the second-gear driven gear 2b and the motor power shaft rotate in the same direction, thereby ensuring normal transmission of the power. Moreover, the intermediate idle gear 413 is sleeved on the first motor power shaft 41, so that the overall structure of the power-drive system 100 is simple and reliable, and the power transmission stability is good.

The transfer gear 43 directly engages with the motor power shaft second gear 421. Alternatively, the transfer gear 43 indirectly engages with the motor power shaft second gear 421. For example, as shown in FIG. 1 to FIG. 3, a motor power shaft fourth gear 422 is further fixedly arranged on the second motor power shaft 42, and the motor power shaft fourth gear 422 meshes with the transfer gear 43. The motor power shaft second gear 421 can be idly sleeved on the second motor power shaft 42, and a second motor power shaft synchronizer 42c for engaging the motor power shaft second gear 421 with the second motor power shaft 42 is further arranged on the second motor power shaft 42. That is, the power at the transfer gear 43 can be transmitted to the second motor power shaft 42 through the motor power shaft fourth gear 422, the second motor power shaft 42 can transmit the power to the motor power shaft second gear 421 through the second motor power shaft synchronizer 42c, and the motor power shaft second gear 421 can transmit the power to the second-gear driven gear 2b.

Thus, when the first motor generator 4 is used as a motor, the power of the first motor generator 4 can be transmitted to the second-gear driven gear 2b through the first motor gear, the transfer gear 43, the second motor power shaft 42 and the motor power shaft second gear 421 in sequence, and the second-gear driven gear 2b can transmit the power to the main reducer driven gear 9 through the first output shaft 31 and the first output shaft output gear 31e to drive the wheels to rotate.

The first motor generator 4 is a main drive motor of the power-drive system 100, so the capacity and size of the first motor generator 4 are large. By providing the transfer gear 43, the first motor generator 4 can transmit the power to the second-gear driven gear 2b and the differential respectively, thereby minimizing the size of the power-drive system 100, and avoiding interference between the first motor generator 4 and the second motor generator 6.

In some embodiments of the present disclosure, the first motor power shaft synchronizer 41c and the second motor power shaft synchronizer 42c can share a first shift mechanism, and the engagement and disengagement states of the motor power shaft first gear 411 and the first motor power shaft 41 are opposite to those of the motor power shaft second gear 421 and the second motor power shaft 42, that is, when one of the first motor power shaft synchronizer 41c and the second motor power shaft synchronizer 42c is engaged, the other synchronizer is necessarily disengaged. When the first motor generator 4 is in operation, the first shift mechanism can simultaneously shift the first motor power shaft synchronizer 41c and the second motor power shaft synchronizer 42c. When the first shift mechanism shifts the first motor power shaft synchronizer 41c and the second motor power shaft synchronizer 42c to the right, the motor power shaft first gear 411 is disengaged from the first motor power shaft 41, and the motor power shaft second gear 421 is engaged with the second motor power shaft 42. When the first shift mechanism shifts the first motor power shaft synchronizer 41c and the second motor power shaft synchronizer 42c to the left, the motor power shaft first gear 411 is engaged with the first motor power shaft 41, and the motor power shaft second gear 421 is disengaged from the second motor power shaft 42. In this way, a shift mechanism can be saved, so that the power-drive system 100 is simple in structure, convenient to operate, and small in size.

It should be noted that the above-mentioned "link" can be understood as associated movement of a plurality of components (e.g., two). Taking the linkage of two components as an example, when one of the components moves, the other component also moves.

For example, in some embodiments of the present disclosure, the linkage of a gear and a shaft can be understood as, when the gear rotates, the shaft linked with the gear also rotates, or when the shaft rotates, the gear linked with the shaft also rotates.

For another example, the linkage of shafts can be understood as, when one of the shafts rotates, the other shaft linked with the shaft also rotates.

For another example, the linkage of gears can be understood as, when one of the gears rotates, the other gear linked with the gear also rotates.

In the following description of the present disclosure, the "link" is understood as the same, unless otherwise specified.

In an embodiment of the present disclosure, the rated power of the first motor generator 4 is greater than that of the second motor generator 6. The second motor generator 6 can be a motor generator having small size and small rated power, so that the power-drive system 100 is simple in structure and small in size. In addition, during the stationary power generation, the transmission path between the second motor generator 6 and the engine 1 is short, the power generation efficiency is high, and a part of the power of the engine 1 can be efficiently converted into electric energy. Furthermore, the peak power of the first motor generator 4 is also greater than that of the second motor generator 6.

In some embodiments of the present disclosure, the rated power of the first motor generator 4 is two or more times that of the second motor generator 6. The peak power of the first motor generator 4 is two or more times that of the second motor generator 6. For example, the rated power of the first motor generator 4 may be 60 kW, the rated power of the second motor generator 6 may be 24 kW, the peak power of the first motor generator 4 may be 120 kW, and the peak power of the second motor generator 6 may be 44 kW.

The following describes the operating modes of the power-drive system 100 for the vehicle 1000 according to an embodiment of the present disclosure in detail with reference to the accompanying drawings. The difference between the power-drive system 100 shown in FIG. 2 and FIG. 3 and the power-drive system 100 shown in FIG. 1 is mainly embodied in the arrangement of the second motor generator 6, but the arrangement of the second motor generator 6 has little influence on the operating mode, so the operating mode of the power-drive system 100 shown in FIG. 2 and FIG. 3 is substantially the same as the operating mode of the power-drive system 100 shown in FIG. 1. The following describes the operating mode of the power-drive system 100 shown in FIG. 1 in detail as an example.

Pure engine mode: the power of the engine 1 is transmitted to the first input shaft 21 and/or the second input shaft 22 through the first clutch device 5d, then transmitted to the first output shaft 31 or the second output shaft 32 through a corresponding gear-position gear pair, and finally transmitted to the differential to drive the wheels to rotate. The gear-position gear pair includes a gear-position driving gear and a gear-position driven gear corresponding to each other. It should be noted that when the vehicle 1000 is at the reversing gear, the power of the engine 1 is transmitted to the first-gear driving gear 1a through the input end 51d of the first clutch device 5d and the first input shaft 21, the first-gear driving gear 1a meshes with the first reversing shaft gear 81 to transmit the power to the reversing shaft 8, the reversing shaft 8 transmits the power to the reversing output gear 83 through the second reversing shaft gear 82, the reversing output gear 83 transmits the power to the second output shaft 32 through the reversing synchronizer (i.e., the sixth-gear synchronizer 6c), and the second output shaft 32 transmits the power to the differential through the second output shaft output gear 32e to implement the reversing gear operation of the vehicle 1000. In this mode, the input end 51d of the first clutch device 5d selectively engages with at least one of the two output ends.

First pure electric mode: when the first motor generator 4 is used as a motor, the power of the first motor generator 4 is transmitted to the differential through the first motor gear, the transfer gear 43, the motor power shaft third gear 412, the first motor power shaft synchronizer 41c, the first motor power shaft 41 and the motor power shaft first gear 411 in sequence to drive the wheels to rotate. In this mode, the first motor power shaft synchronizer 41c is engaged.

Second pure electric mode: when the first motor generator 4 is used as a motor, the power of the first motor generator 4 is transmitted to the second-gear driven gear 2b through the first motor gear, the transfer gear 43, the motor power shaft fourth gear 422, the second motor power shaft 42, the second motor power shaft synchronizer 42c and the motor power shaft second gear 421 in sequence, the second-gear driven gear 2b transmits the power to the first output shaft 31 through the second-fourth-gear synchronizer 24c, and the first output shaft 31 links with the differential to drive the wheels to rotate. In this mode, the second motor power shaft synchronizer 42c is engaged.

First hybrid mode: a combination of the pure engine mode and the first pure electric mode, the power of the engine 1 and the power of the first motor generator 4 are coupled at the main reducer driven gear 9.

Second hybrid mode: a combination of the pure engine mode and the second pure electric mode. When the engine 1 outputs power through the first output shaft 31, the power of the engine 1 and the power of the first motor generator 4 are coupled on the first output shaft 31. When the engine 1 outputs power through the second output shaft 32, the power of the engine 1 and the power of the first motor generator 4 are coupled at the main reducer driven gear 9. When the power of the engine 1 is divided into a first part and a second part, the first part of the power is output through the first output shaft 31 and the second part of the power is output through the second output shaft 32, the power of the first motor generator 4 and the first part of the power of the engine 1 are coupled at the first output shaft 31, and then the coupled power and the second part of the power of the engine 1 are coupled again at the main reducer driven gear 9.

Stationary power generation mode: the power of the engine 1 is all transmitted to the second motor generator 6 through the input end 51d of the first clutch device 5d, and the second motor generator 6 functions as a generator for stationary power generation.

First driving power generation mode: a part of the power of the engine 1 is transmitted to the differential through the first clutch device 5d, the input shaft and the output shaft to drive the wheels to rotate, and the other part of the power of the engine 1 is transmitted to the second motor generator 6 for power generation through the input end 51d of the first clutch device 5d.

Second driving power generation mode: the power of the engine 1 is transmitted to the differential through the first clutch device 5d, the input shaft and the output shaft to drive the wheels to rotate, and the main reducer driven gear 9 can transmit a part of the power to the first motor generator 4 for power generation through the motor power shaft first gear 411, the first motor power shaft 41, the first motor power shaft synchronizer 41c, the motor power shaft third gear 412, the transfer gear 43 and the first motor gear.

Third driving power generation mode: the power of the engine 1 is transmitted to the differential through the first clutch device 5d, the input shaft and the first output shaft 31 to drive the wheels to rotate, and a part of the power on the first output shaft 31 can be transmitted to the first motor generator 4 for power generation through the second-fourth-gear synchronizer 24c, the second-gear driven gear 2b, the intermediate idle gear 413, the motor power shaft second gear 421, the second motor power shaft synchronizer 42c, the second motor power shaft 42, the motor power shaft fourth gear 422, the transfer gear 43 and the first motor gear.

Fourth driving power generation mode: a combination of the first driving power generation mode and the second driving power generation mode.

Fifth driving power generation mode: a combination of the first driving power generation mode and the third driving power generation mode.

Figure 4:
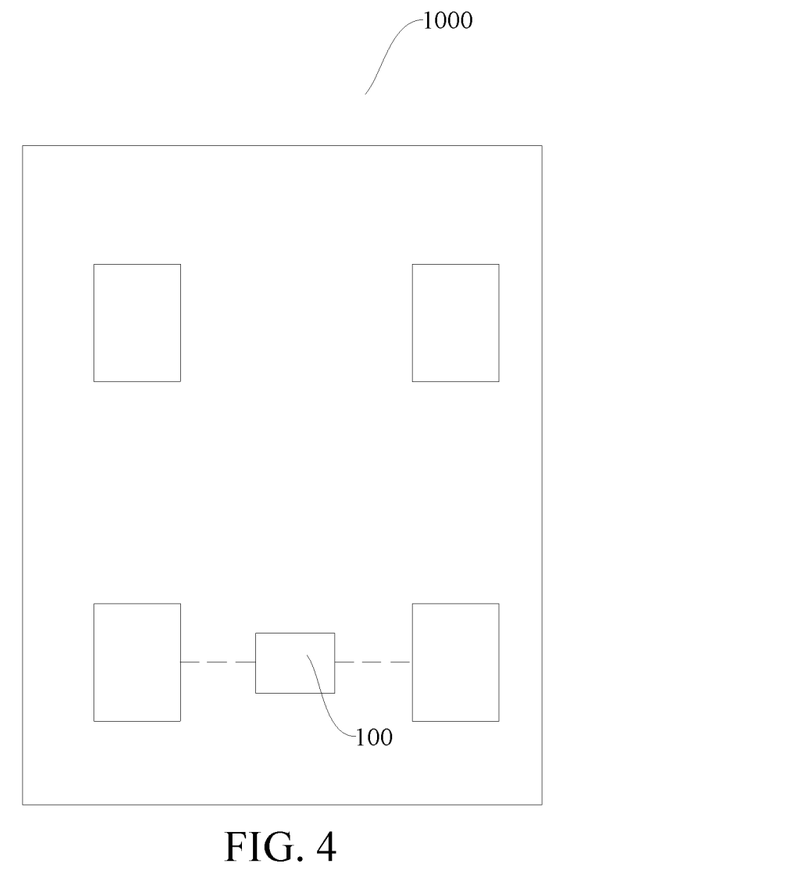
FIG. 4 is a structure diagram of a vehicle according to an embodiment of the present disclosure.

As shown in FIG. 4, the vehicle 1000 according to an embodiment of the present disclosure includes the power-drive system 100 for a vehicle 1000 according to the above embodiments.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of this disclosure. In this specification, schematic descriptions of the foregoing terms do not need to aim at a same embodiment or example. Besides, the specific features, the structures, the materials or the characteristics that are described may be combined in a proper manner in any one or more embodiments or examples. In addition, in a case that is not mutually contradictory, persons skilled in the art can combine or group different embodiments or examples that are described in this specification and features of the different embodiments or examples.

Although the embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A power-drive system for a vehicle, comprising:
   an engine;
   a plurality of input shafts, the engine being configured to selectively engage with at least one of the plurality of input shafts, and a gear-position driving gear being arranged on each input shaft;
   a plurality of output shafts, a gear-position driven gear being arranged on each output shaft, the gear-position driven gears correspondingly meshing with the gear-position driving gears;
   a first motor power shaft, a motor power shaft first gear being arranged on the first motor power shaft, and the motor power shaft first gear and the plurality of output shafts linking with a differential of the vehicle respectively;
   a second motor power shaft, a motor power shaft second gear being arranged on the second motor power shaft, and the motor power shaft second gear linking with one gear-position driven gear;
   a transfer gear, configured to selectively engage with the motor power shaft first gear so as to link with the motor power shaft first gear, and selectively engage with the motor power shaft second gear so as to link with the motor power shaft second gear;
   a first motor generator, configured to link with the transfer gear,
   a first clutch device, arranged between the engine and the plurality of input shafts; and
   a second motor generator, the second motor generator and the engine being located on an input side of the first clutch device, the plurality of input shafts being located on an output side of the first clutch device, and the second motor generator being configured to carry out stationary power generation using at least part of power of the engine when the vehicle is parked.

2. The power-drive system for a vehicle according to claim 1, wherein the first clutch device is a double-clutch device and has an input end, a first output end and a second output end, the input end selectively engaging with at least one of the first output end and the second output end.

3. The power-drive system for a vehicle according to claim 2, wherein the input end is provided with input end outer teeth, and the second motor generator links with the input end outer teeth.

4. The power-drive system for a vehicle according to claim 2, wherein the second motor generator is coaxially connected with the input end of the first clutch device.

5. The power-drive system for a vehicle according to claim 1, wherein a second clutch device is arranged between the second motor generator and the engine.

6. The power-drive system for a vehicle according to claim 5, wherein the second clutch device is arranged inside a rotor of the second motor generator.

7. The power-drive system for a vehicle according to claim 5, wherein the engine, the second clutch device and the input end of the first clutch device are arranged coaxially.

8. The power-drive system for a vehicle according to claim 1, wherein the rated power of the first motor generator is greater than that of the second motor generator.

9. The power-drive system for a vehicle according to claim 8, wherein the rated power of the first motor generator is two or more times that of the second motor generator.

10. The power-drive system for a vehicle according to claim 1, wherein the second motor generator is located between the first clutch device and the engine.

11. The power-drive system for a vehicle according to claim 1, wherein a motor power shaft third gear is further freely sleeved on the first motor power shaft, the motor power shaft third gear meshes with the transfer gear, and a first motor power shaft synchronizer for engaging the motor power shaft third gear with the first motor power shaft is further arranged on the first motor power shaft.

12. The power-drive system for a vehicle according to claim 11, wherein the motor power shaft second gear is idly sleeved on the second motor power shaft, and a second motor power shaft synchronizer for engaging the motor power shaft second gear with the second motor power shaft is further arranged on the second motor power shaft.

13. The power-drive system for a vehicle according to claim 12, wherein the first motor power shaft synchronizer and the second motor power shaft synchronizer share a first shift mechanism, and the engagement and disengagement states of the motor power shaft first gear and the first motor power shaft are opposite to those of the motor power shaft second gear and the second motor power shaft.

14. The power-drive system for a vehicle according to claim 12, further comprising: an intermediate idle gear, being idly sleeved on the first motor power shaft and meshing with one gear-position driven gear and the motor power shaft second gear respectively.

15. The power-drive system for a vehicle according to claim 11, wherein a motor power shaft fourth gear is further fixedly arranged on the second motor power shaft, and the motor power shaft fourth gear meshes with the transfer gear.

16. The power-drive system for a vehicle according to claim 1, wherein the motor power shaft first gear is fixedly arranged on the first motor power shaft.

17. The power-drive system for a vehicle according to claim 1, wherein
a reversing output gear is freely sleeved on one of the plurality of output shafts, and a reversing synchronizer for engaging the reversing output gear with the one of the plurality of output shafts is further arranged on the output shaft; and
the power-drive system further comprises: a reversing shaft, a first reversing shaft gear and a second reversing shaft gear being fixedly arranged on the reversing shaft, the first reversing shaft gear meshing with one gear-position driving gear, and the second reversing shaft gear meshing with the reversing output gear.

18. The power-drive system for a vehicle according to claim 17, wherein
the plurality of input shafts comprises: a first input shaft and a second input shaft, the second input shaft being sleeved on the first input shaft, a first-gear driving gear, a third-gear driving gear and a fifth-gear driving gear being arranged on the first input shaft, and a second-gear driving gear and a fourth-sixth-gear driving gear being arranged on the second input shaft;
the plurality of output shafts comprises: a first output shaft and a second output shaft, a first-gear driven gear, a second-gear driven gear, a third-gear driven gear and a fourth-gear driven gear being freely sleeved on the first output shaft, and a fifth-gear driven gear and a sixth-gear driven gear being freely sleeved on the second output shaft;
a first-third-gear synchronizer is arranged between the first-gear driven gear and the third-gear driven gear, a second-fourth-gear synchronizer is arranged between the second-gear driven gear and the fourth-gear driven gear, a fifth-gear synchronizer is arranged on one side of the fifth-gear driven gear, and a sixth-gear synchronizer is arranged on one side of the sixth-gear driven gear.

19. A vehicle, comprising:
a power-drive system including:
an engine;
a plurality of input shafts, the engine being configured to selectively engage with at least one of the plurality of input shafts, and a gear-position driving gear being arranged on each input shaft;
a plurality of output shafts, a gear-position driven gear being arranged on each output shaft, the gear-position driven gears correspondingly meshing with the gear-position driving gears;
a first motor power shaft, a motor power shaft first gear being arranged on the first motor power shaft, and the motor power shaft first gear and the plurality of output shafts linking with a differential of the vehicle respectively;
a second motor power shaft, a motor power shaft second gear being arranged on the second motor power shaft, and the motor power shaft second gear linking with one gear-position driven gear;
a transfer gear, configured to selectively engage with the motor power shaft first gear so as to link with the motor power shaft first gear, and selectively engage with the motor power shaft second gear so as to link with the motor power shaft second gear;
a first motor generator, configured to link with the transfer gear,
a first clutch device, arranged between the engine and the plurality of input shafts; and
a second motor generator, the second motor generator and the engine being located on an input side of the first clutch device, the plurality of input shafts being located on an output side of the first clutch device, and the second motor generator being configured to carry out stationary power generation using at least part of power of the engine when the vehicle is parked.

* * * * *